| (12) | United States Patent | (10) Patent No.: | US 9,416,747 B2 |
|---|---|---|---|
| | Mashiki | (45) Date of Patent: | Aug. 16, 2016 |

(54) INTERNAL COMBUSTION ENGINE CONTROL APPARATUS

(75) Inventor: Zenichiro Mashiki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 136 days.

(21) Appl. No.: 14/343,989

(22) PCT Filed: Sep. 14, 2011

(86) PCT No.: PCT/JP2011/071018
§ 371 (c)(1),
(2), (4) Date: Mar. 10, 2014

(87) PCT Pub. No.: WO2013/038524
PCT Pub. Date: Mar. 21, 2013

(65) Prior Publication Data
US 2014/0230793 A1    Aug. 21, 2014

(51) Int. Cl.
*F02D 41/30* (2006.01)
*F02D 41/38* (2006.01)
(Continued)

(52) U.S. Cl.
CPC ............ *F02D 41/30* (2013.01); *F02D 41/0032* (2013.01); *F02D 41/3094* (2013.01); *F02D 41/3863* (2013.01); *F02D 41/40* (2013.01);
(Continued)

(58) Field of Classification Search
CPC . F02D 41/30; F02D 41/3094; F02D 41/0032; F02D 2200/0602
USPC ........... 123/299, 300, 431, 520; 701/103–105
See application file for complete search history.

(56) References Cited

U.S. PATENT DOCUMENTS 7,121,261 B2 * 10/2006 Kinose ................ F02D 41/3094
 123/431
7,281,517 B2 * 10/2007 Miyazaki ................ F02D 41/30
 123/431
(Continued)

FOREIGN PATENT DOCUMENTS

EP    1 605 150 A2    12/2005
JP    03-185242    8/1991
(Continued)

OTHER PUBLICATIONS

International Search Report issued Oct. 11, 2011 in PCT/JP11/071018 filed Sep. 14, 2011.
(Continued)

*Primary Examiner* — Hai Huynh
(74) *Attorney, Agent, or Firm* — Oblon, McClelland, Maier & Neustadt, L.L.P.

(57) ABSTRACT

In a dual-fuel injection operation, when a fuel injection time by a direct injector as determined on the basis of a direct fuel pressure is less than a minimum value, a dual-injection is performed with a duel injection rate such that the amount of fuel injected by the direct injector is greater than when the dual-injection is performed with a duel injection rate which is determined in accordance with an engine operation state. Thus, the amount of fuel injected by the direct injector is increased, so that the high-temperature fuel that has remained in a high-pressure fuel pipe connected to the injector is rapidly injected and consumed. As a result, the direct fuel pressure can be rapidly lowered, whereby the fuel injection time by the direct injector for implementing an amount of fuel injection in accordance with a direct injection command value can be rapidly increased to the minimum value.

5 Claims, 7 Drawing Sheets

(51) Int. Cl.
  *F02D 41/40* (2006.01)
  *F02D 41/00* (2006.01)
(52) U.S. Cl.
  CPC ......... *F02D 2200/0602* (2013.01); *Y02T 10/44* (2013.01)

(56) References Cited

U.S. PATENT DOCUMENTS

| | | | |
|---|---|---|---|
| 8,843,260 B2* | 9/2014 | Fukuzawa | B60W 20/00 180/65.21 |
| 2005/0274368 A1 | 12/2005 | Itakura et al. | |
| 2007/0119413 A1 | 5/2007 | Lewis et al. | |
| 2011/0048393 A1* | 3/2011 | Akita | F02D 41/0032 123/704 |
| 2013/0247874 A1* | 9/2013 | Saito | F02D 41/3854 123/446 |

FOREIGN PATENT DOCUMENTS

| | | |
|---|---|---|
| JP | 2001-336439 | 12/2001 |
| JP | 2003-009431 | 1/2003 |
| JP | 2005-351216 | 12/2005 |
| JP | 2006-077730 | 3/2006 |
| JP | 2006-090151 | 4/2006 |
| JP | 2007-032328 | 2/2007 |
| JP | 2009-185741 | 8/2009 |
| JP | 2009-191662 | 8/2009 |
| JP | 2011-047314 | 3/2011 |

OTHER PUBLICATIONS

International Preliminary Report on Patentability issued Sep. 14, 2011, in International Application No. PCT/JP2011/071018 (English translation only).

Extended European Search Report issued Nov. 16, 2015 in Patent Application No. 11872198.4.

* cited by examiner

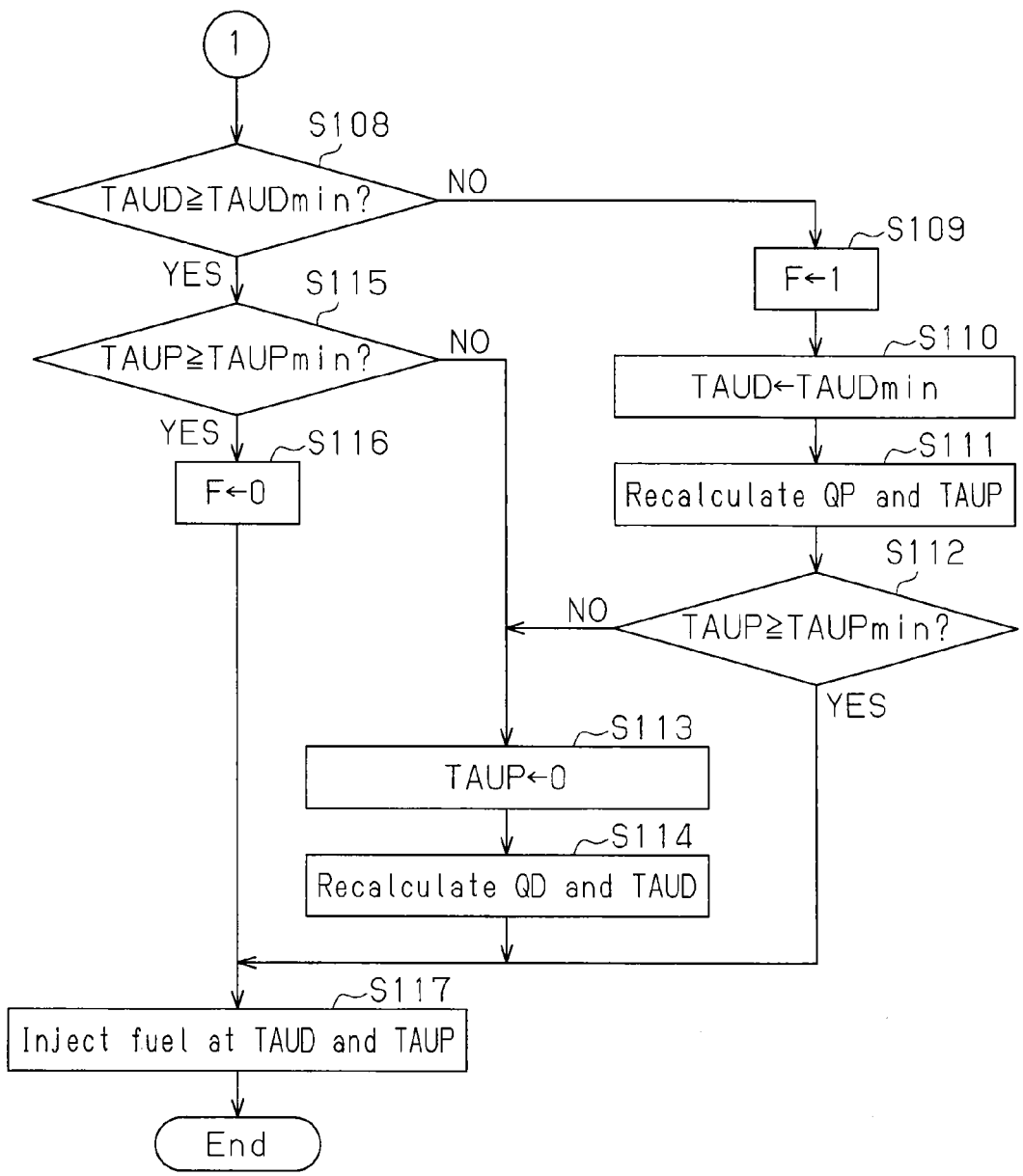

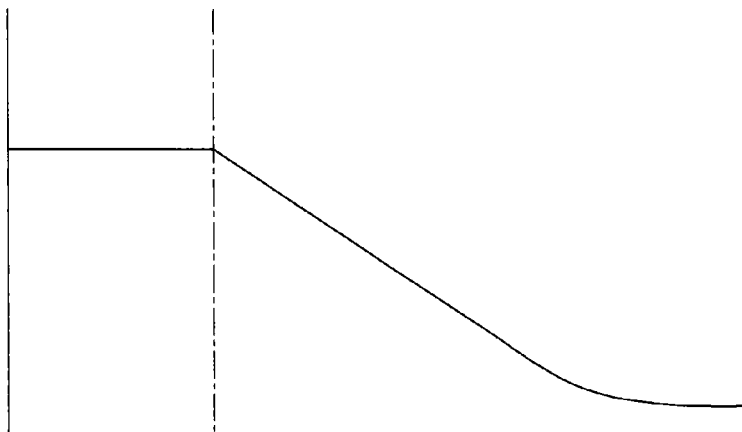
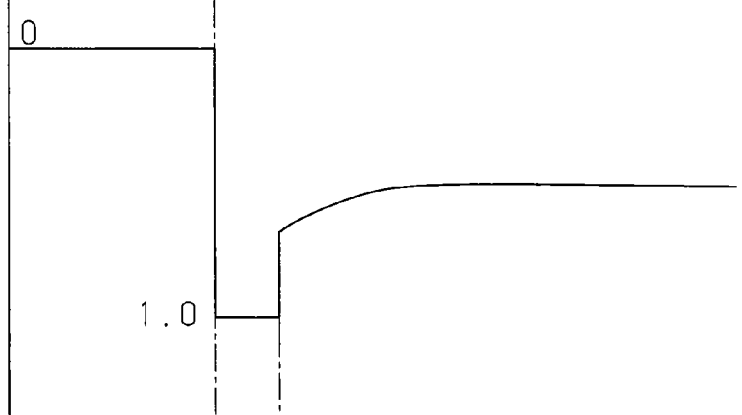
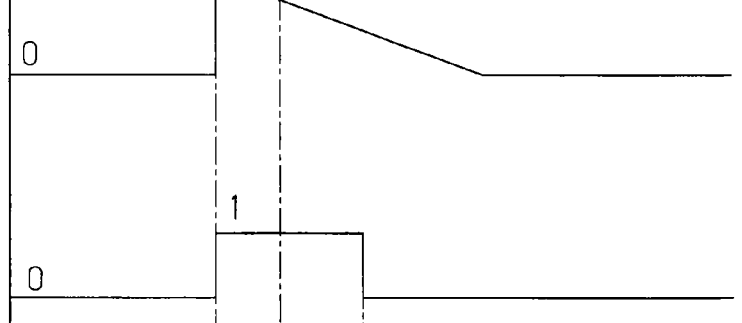
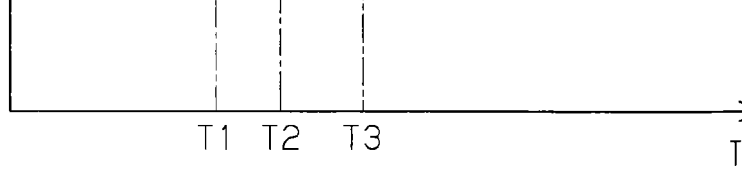
Fig.6(a) Direct Injection Pressure
Fig.6(b) Actual Dual-Injection Rate
Fig.6(c) Advancement Amount A
Fig.6(d) Flag F

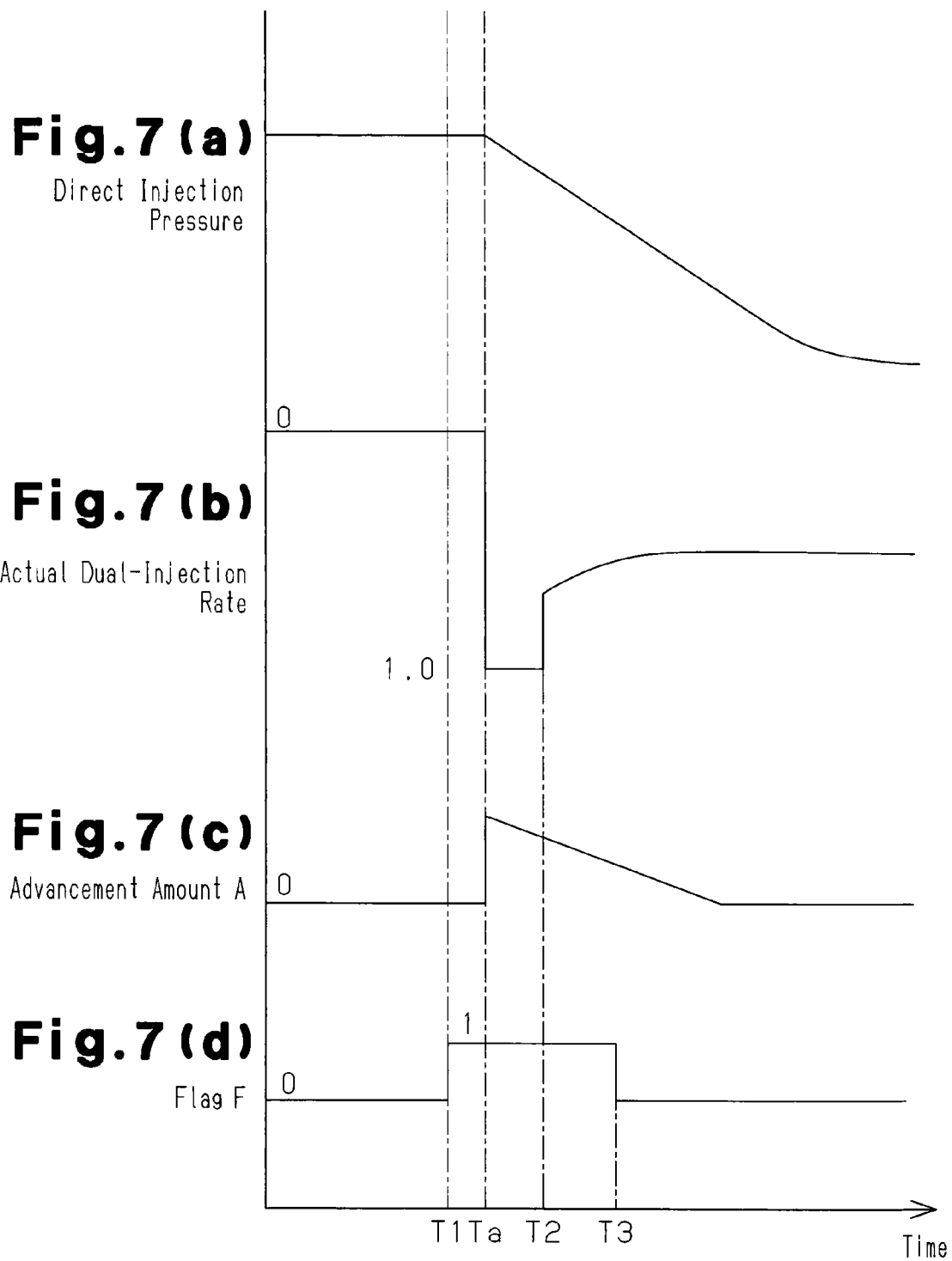

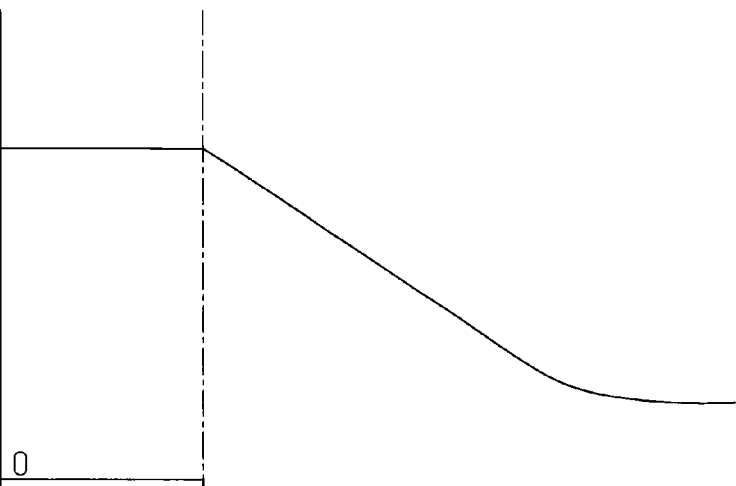
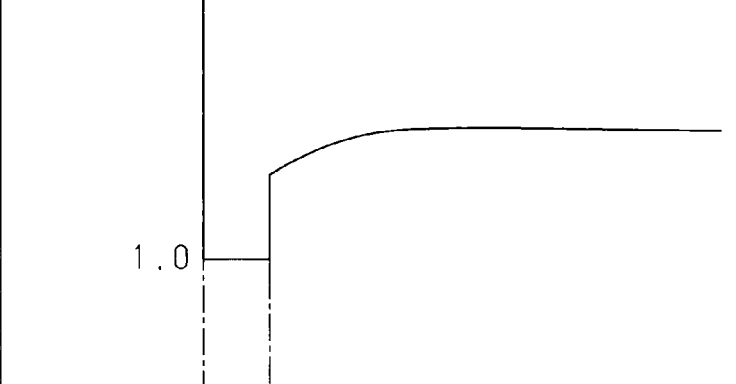

INTERNAL COMBUSTION ENGINE CONTROL APPARATUS

FIELD OF THE DISCLOSURE

The present invention relates to a control apparatus for an internal combustion engine.

BACKGROUND OF THE DISCLOSURE

As described in Patent Document 1, internal combustion engines having a port injector for injecting fuel into an intake port and a direct injector for injecting fuel into a cylinder have been mounted in vehicles. These engines perform dual-injection, in which fuel injection by the amount corresponding to an injection amount command value, which is determined based on an engine operating state, is carried out through the port injector and the direct injector in a divided manner at a dual-injection rate, which is obtained in accordance with the engine operating state.

In the dual-injection, fuel is injected from the port injector and the direct injector in the manner described below, for example. Specifically, the injection amount command value is divided into a port injection command value and a direct injection command value in accordance with the dual-injection rate, which is determined in accordance with the engine operating state. The port injector injects fuel by an amount corresponding to the port injection command value and the direct injector injects fuel by an amount corresponding to the direct injection command value.

The amount of fuel injected by each of the injectors, which are the port injector and the direct injector, is determined based on the pressure of the fuel supplied to each injector and the valve opening time (the fuel injection time) of the injector. Accordingly, for the port injector in the dual-injection, the fuel injection time of the port injector is controlled such that the amount of fuel corresponding to the port injection command value is injected under the pressure of the fuel currently supplied to the port injector. Similarly, for the direct injector in the dual-injection, the fuel injection time of the direct injector is controlled such that the amount of fuel corresponding to the direct injection command value is injected under the pressure of the fuel currently supplied to the direct injector.

PRIOR ART DOCUMENTS

Patent Documents

Patent Document 1: Japanese Laid-Open Patent Publication No. 2001-336439 (paragraphs [0024], [0042], [0051], [0052] and FIGS. 3, 5)

SUMMARY OF THE INVENTION

Problems that the Invention is to Solve

In an internal combustion engine capable of performing such dual-injection, there may be cases in which fuel is injected solely by the port injector for a continuous period of time before the dual-injection is started and thus the direct injector starts to inject fuel.

Specifically, in the continuous period of time in which fuel is injected solely by the port injector, fuel injection from the direct injector is suspended and the fuel stagnates in the fuel supply system connected to the direct injector. The stagnant fuel in the fuel supply system connected to the direct injector is then heated and expanded by the heat generated by the engine. This raises the pressure of the fuel supplied to the direct injector.

As a result, to start the dual-injection and resume the fuel injection from the direct injector, the fuel injection time of the direct injector must be decreased to match the raised pressure of the fuel to ensure that the direct injector injects fuel by the amount corresponding to the direct injection command value. However, if the decreased fuel injection time is less than the minimum value determined by the structure of the direct injector, the fuel injection time is set to the minimum value. In this case, an excessive amount of fuel is injected from the direct injector and thus may affect fuel combustion in the cylinder in an undesired manner.

Accordingly, it is an objective of the present invention to provide a control apparatus for an internal combustion engine capable of quickly ending excessive fuel injection from a direct injector when dual-injection is started, thereby restricting deterioration of fuel combustion in a cylinder caused by such excessive fuel injection.

Means for Solving the Problems

To achieve the foregoing objective, the control apparatus for an internal combustion engine according to the present invention performs dual-injection in which fuel injection by the amount corresponding to an injection amount command value is carried out through injection from a port injector and injection from an direct injector in a manner divided at a dual-injection rate determined in accordance with an engine operating state. At the dual-injection, the pressure of the fuel fed to the direct injector may have risen to such an extent that the fuel injection time of the direct injector determined based on this pressure becomes less than a minimum value, which is determined by the structure of the direct injector. If the fuel injection amount of the direct injector is less than the minimum value, the fuel injection amount of the direct injector is forcibly set to the minimum value. This causes an excessive amount of fuel injected from the direct injector, thus affecting fuel combustion in the cylinder in an undesired manner.

However, if the fuel injection time of the direct injector, which is determined based on the pressure of the fuel supplied to the direct injector at the dual-injection, is less than the minimum value, the above-described control apparatus performs the dual-injection at such a dual-injection rate that fuel injection from the direct injector is more than that in the dual-injection at the dual-injection rate determined in accordance with the engine operating state. This increases the amount of the fuel injected by the direct injector such that the heated fuel stagnant in the fuel supply system connected to the direct injector is rapidly injected and consumed. The pressure of the fuel fed to the direct injector thus quickly lowers and the fuel injection time of the direct injector determined based on this fuel pressure rapidly increases to the minimum value. As a result, even if an excessively raised pressure of the fuel supplied to the direct injector causes excessive fuel injection from the direct injector, such excessive fuel injection is quickly ended and deterioration of fuel combustion in the cylinder brought about by the excessive fuel injection is limited.

In accordance with one aspect of the present invention, during the execution of the dual-injection, if the fuel injection time of the direct injector that is determined based on the pressure of the fuel supplied to the direct injector on the assumption that the dual-injection is executed at the dual-injection rate obtained in accordance with the engine operating state is raised to the minimum value, the injection control section switches the dual-injection to the dual-injection at the dual-injection rate determined in accordance with the engine operating state. Specifically, in the dual-injection at the dual-injection rate increasing the fuel injection from the direct injector compared with the corresponding fuel injection in the dual-injection at the dual-injection rate determined in accordance with the engine operating state, the dual-injection rate does not correspond to the engine operating state, thus making it difficult to ensure optimal fuel combustion in the cylinder. However, in the dual-injection at the aforementioned dual-injection rate increasing the fuel injection from the direct injector, the fuel injection time of the direct injector on the assumption that the dual-injection is executed at the dual-injection rate determined in accordance with the engine operating state is calculated based on the pressure of the fuel fed to the direct injector. When the assumed fuel injection time of the direct injector rises to the minimum value, the dual-injection is switched to the dual-injection at the dual-injection rate determined in accordance with the engine operating state. This restricts unnecessarily prolonged execution of the dual-injection at the dual-injection rate is more than that in the dual-injection at the dual-injection rate determined in accordance with the engine operating state. As a result, non-optimal fuel combustion in the cylinder is restrictive.

The injection control section may employ a dual-injection rate at which fuel is injected solely from the direct injector as the dual-injection rate at which the fuel injection from the direct injector is more than that in the dual-injection at the dual-injection rate determined in accordance with the engine operating state.

The injection control section may perform a first dual-injection and a second dual-injection as the dual-injection at the dual-injection rate at which the fuel injection from the direct injector is more than the fuel injection in the dual-injection at the dual-injection rate determined in accordance with the engine operating state. In the first dual-injection, the direct injector injects fuel for the fuel injection time of the direct injector that is set to the minimum value and the port injector injects, out of the amount of fuel corresponding to the injection amount command value, fuel of an amount that cannot be injected by the direct injector. The second dual-injection is carried out when the amount of fuel injected from the port injector is great to such an extent that the fuel injection time of the port injector in the first dual-injection must be set to a value less than a minimum value. The second dual-injection sets the dual-injection rate to a value at which fuel is injected solely from the direct injector.

In accordance with one aspect of the present invention, an injection timing advancing section advances fuel injection timing of the direct injector if, at the execution of the fuel injection from the direct injector, the pressure of fuel supplied to the direct injector is higher than a threshold value greater than a target value determined in accordance with the engine operating state. Specifically, when the pressure of the fuel supplied to the direct injector is higher than the threshold value, the fuel injected from the direct injector has a high penetration property. This makes it difficult for the fuel to disperse and ensure desired fuel injection in the cylinder. However, by advancing the fuel injection timing of the direct injector when the pressure of the fuel fed to the direct injector is greater than or equal to the threshold value, the fuel injected by the direct injector strikes the top surface of the piston of the internal combustion engine. This disperses the fuel in the cylinder and thus ensures the desired fuel combustion.

In accordance with one aspect of the present invention, a purge restricting section restricts flow of gas from a canister into an intake system of the engine when the dual-injection is performed at the dual-injection rate at which the fuel injection from the direct injector is more than that in the dual-injection at the dual-injection rate determined in accordance with the engine operating state. When gas flows from the canister into the intake system in the internal combustion engine, the injection amount command value decreases by the amount corresponding to the amount of the fuel contained in the gas. In this state, the fuel injection time of the direct injector for the dual-injection is likely to be less than the minimum value. Such likeliness is limited by the purge restricting section through restriction of the gas flow from the canister into the engine intake system.

In accordance with one aspect of the present invention, the timing for starting restriction of the gas flow from the canister into the intake system of the engine is advanced relative to the timing for starting the dual-injection at the dual-injection rate at which the fuel injection from the direct injector is increased. Specifically, after restriction of the gas flow from the canister into the intake system of the internal combustion engine is started, such restriction is reflected in operation of the engine only after a certain period of time. Accordingly, if the timing for starting the dual-injection at the dual-injection rate increasing the fuel injection by the direct injector coincides with the timing for starting the restriction of the gas flow from the canister into the intake system of the engine, the fuel injection time of the direct injector is likely to be less than the minimum value until the gas flow restriction is reflected in the engine operation. However, such likeliness is limited by advancing the timing for starting the gas flow restriction from the canister into the intake system of the engine relative to the timing for starting the dual-injection at the dual-injection rate increasing the fuel injection from the direct injector. In other words, the dual-injection at the dual-injection rate increasing the fuel injection from the direct injector is started only after the gas flow restriction is reflected in the engine operation. This limits the above-described likeliness that the fuel injection time of the direct injector becomes less than the minimum value.

BRIEF DESCRIPTION OF THE DRAWINGS

FIG. 5 is a flowchart representing a detailed procedure for the dual-injection;

FIG. 6 is a timing chart, in which section (a) represents changes of the direct injection pressure, section (b) represents changes of the actual dual-injection rate, section (c) represents changes of the advancement amount, and section (d) represents changes of the flag as the time elapses when port injection is switched to dual-injection;

FIG. 7 is another timing chart in which section (a) represents changes of the direct injection pressure, section (b) represents changes of the actual dual-injection rate, section (c) represents changes of the advancement amount, and section (d) represents changes of the flag as the time elapses when the port injection is switched to the dual-injection; and FIG. 8 is another timing chart in which section (a) represents changes of the direct injection pressure, section (b)

represents changes of the actual dual-injection rate, section (c) represents changes of the advancement amount, and section (d) represents changes of the flag as the time elapses when the port injection is switched to the dual-injection.

DETAILED DESCRIPTION OF THE PREFERRED EMBODIMENTS

A control apparatus for a vehicle engine according to one embodiment of the present invention will now be described with reference to FIGS. 1 to 6.

Figure 1:
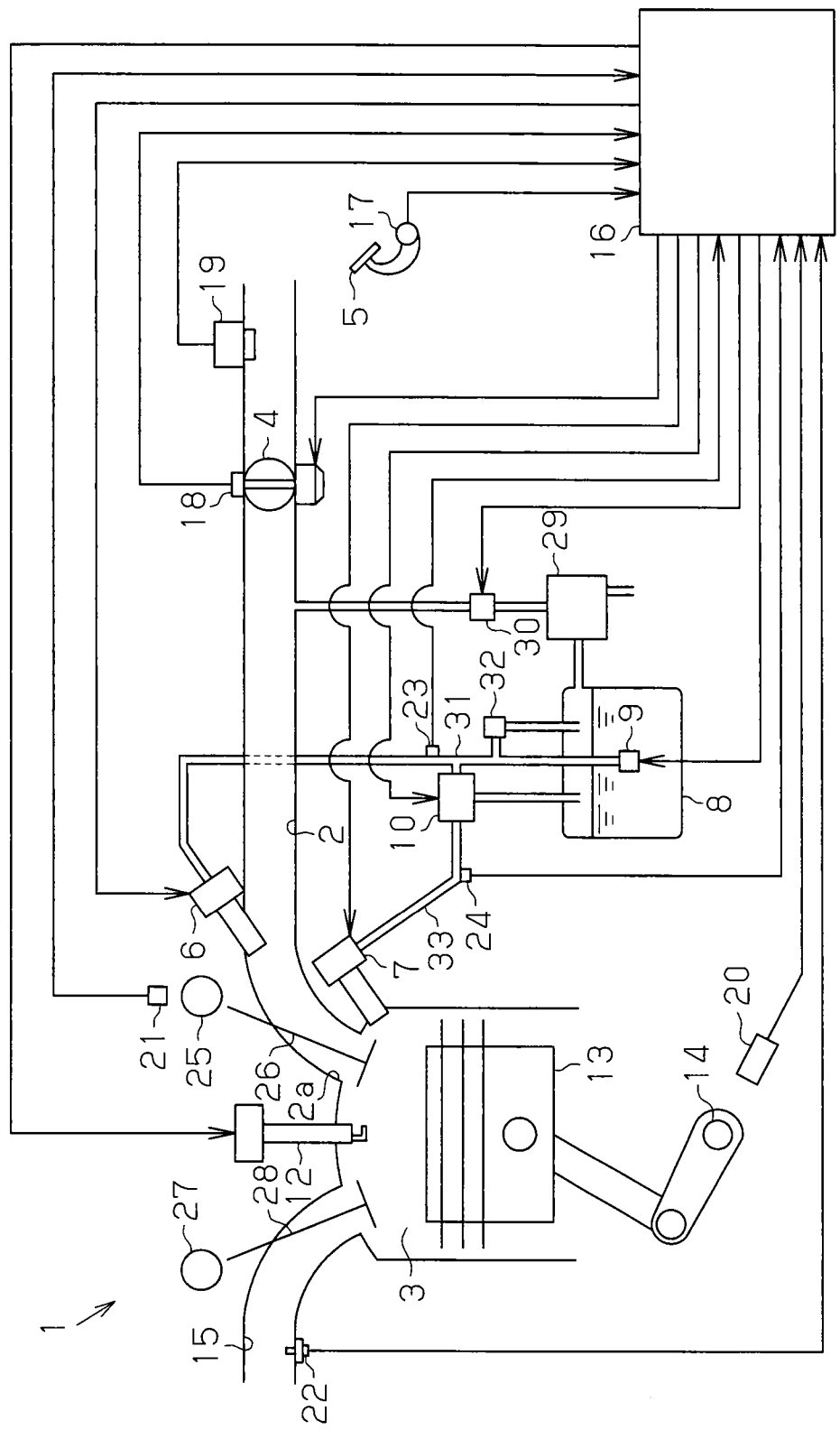
FIG. 1 is a diagram schematically showing an engine as a whole employing a control apparatus according to an illustrated embodiment of the present invention.

As shown in FIG. 1, an intake passage 2 of an engine 1 has a throttle valve 4, which is selectively opened and closed to adjust the amount of the air drawn to a combustion chamber 3 (the intake air amount). The opening degree of the throttle valve 4 (the throttle opening degree) is adjusted in accordance with the operating amount of an accelerator pedal 5 (the accelerator operating amount), which is depressed by the driver of the vehicle. The engine 1 also includes a port injector 6 for injecting fuel from the intake passage 2 to an intake port 2a formed in the combustion chamber 3 and a direct injector 7 for injecting fuel into the combustion chamber 3 (into a cylinder). The fuel is supplied from a fuel tank 8 to the injectors 6, 7.

Specifically, the fuel in the fuel tank 8 is pumped out by a feed pump 9 and then sent to the port injector 6 through a low-pressure fuel pipe 31. The pressure of the fuel in the low-pressure fuel pipe 31 is adjusted to feed pressure through control on operation of the feed pump 9 and prevented from excessively rising by means of a pressure regulator 32, which is mounted in the low-pressure fuel pipe 31. Some of the fuel in the low-pressure fuel pipe 31, which has been pumped out by the feed pump 9, is pressurized by a high-pressure fuel pump 10 to high pressure (hereinafter, direct injection pressure) compared with the feed pressure. The pressurized fuel is then fed to the direct injector 7 through a high-pressure fuel pipe 33.

In the engine 1, air-fuel mixture is formed by the fuel injected from the injectors 6, 7 and the air flowing in the intake passage 2 and retained in the combustion chamber 3. A spark plug 12 ignites the air-fuel mixture, burning the mixture. Such burning produces combustion energy, which reciprocates a piston 13 and thus rotating a crankshaft 14. The burned air-fuel mixture is discharged into an exhaust passage 15 as exhaust gas. Communication between the combustion chamber 3 and the intake passage 2 is selectively permitted and blocked by an intake valve 26, which is selectively opened and closed through rotation of an intake camshaft 25 to which rotation of the crankshaft 14 is transmitted. Similarly, communication between the combustion chamber 3 and the exhaust passage 15 is selectively permitted and blocked by an exhaust valve 28, which is selectively opened and closed through rotation of an exhaust camshaft 27 to which the rotation of the crankshaft 14 is transmitted.

A vehicle employing the engine 1 has a fuel vapor treatment unit for treating fuel vapor produced in the fuel tank 8. The treatment unit includes a canister 29 having adsorbent such as activated carbon for adsorbing the fuel vapor, which is produced in the fuel tank 8. The atmospheric air is introduced into the canister 29. Then, together with the atmospheric air, the fuel vapor adsorbed to the adsorbent is sent to a position downstream to the throttle valve 4 in the intake passage 2. The air containing the fuel vapor (the purge gas) that has been sent to the intake passage 2 is burned by the engine 1 and thus treated. The fuel vapor treatment unit also includes a purge control valve 30, of which the opening degree is controlled to adjust the flow rate of the purge gas. Flow of the purge gas into the intake passage 2 is selectively prohibited and permitted through such control of the opening degree of the purge control valve 30.

The electric configuration of the control apparatus for the engine 1 will hereafter be described.

The control apparatus includes an electronic control unit 16 for performing various operation controls on the engine 1. The electronic control unit 16 has a CPU for executing various calculation procedures related to the aforementioned controls, a ROM for storing programs and data necessary for the controls, a RAM for temporarily storing calculation results from the CPU, and input and output ports for inputting and outputting signals with respect to the exterior.

Various types of sensors are connected to the input port of the electronic control unit 16, as described below.

An accelerator position sensor 17 detects the accelerator operating amount.

A throttle position sensor 18 detects the throttle opening degree.

An air flow meter 19 detects the amount of the air passing through the intake passage 2 (the intake air amount of the engine 1).

A crank position sensor 20 outputs a signal corresponding to rotation of the crankshaft 14.

A cam position sensor 21 for outputting a signal corresponding to the rotational position of the shaft 27 based on rotation of the intake camshaft 25.

An air-fuel ratio sensor 22 outputs a signal corresponding to the oxygen concentration in the exhaust gas flowing in the exhaust passage 15.

A first pressure sensor 23 detects the pressure of the fuel in the low-pressure fuel pipe 31 (the feed pressure).

A second pressure sensor 24 detects the pressure of the fuel in the high-pressure fuel pipe 33 (the direct injection pressure).

Drive circuits and the like for various types of devices such as the port injector 6, the direct injector 7, the feed pump 9, the high-pressure fuel pump 10, the spark plug 12, and the purge control valve 30 are connected to the output of the electronic control unit 16.

The electronic control unit 16 determines the engine operating state, including the engine speed and the engine load, based on signals input by those sensors and, based on the engine operating state, outputs command signals to the drive circuits of the devices such as the injectors 6, 7, the feed pump 9, the spark plug 12, and the purge control valve 30. In this manner, the various operation controls for the engine 1, including fuel injection control for the engine 1, control of the pressure of the fuel supplied to the injectors 6, 7 (the fuel pressure), ignition timing control for the engine 1, and opening degree control for the purge control valve 30, are performed by the electronic control unit 16. Specifically, the engine speed is determined based on a detection signal from the crank position sensor 20. The engine load is calculated using a parameter corresponding to the intake air amount of the engine 1 and the aforementioned engine speed. Parameters corresponding to the intake air amount include an actual measurement value of the intake air amount of the engine 1, which is obtained using a detection signal from the air flow meter 19, the throttle opening value determined using a detection signal from the throttle position sensor 18, or an accelerator depression amount obtained using a detection signal from the accelerator position sensor 17.

Fuel injection amount control, which is performed as part of the fuel injection control on the engine 1, is carried out by determining an injection amount command value Qfin based on the engine operating state including the engine speed and the engine load and then injecting fuel from at least one of the port injector 6 and the direct injector 7 by the amount corresponding to the injection amount command value Qfin. The injection amount command value Qfin is corrected to increase or decrease based on a detection signal from the air-fuel ratio sensor 22 (air-fuel ratio feedback correction) such that the detection signal from the air-fuel ratio sensor 22 corresponds to the value obtained by burning the air-fuel mixture in the combustion chamber 3 at the stoichiometric air-fuel ratio. Specifically, if the detection signal from the air-fuel ratio sensor 22 represents a rich value compared with the value obtained by burning the air-fuel mixture in the combustion chamber 3 by the theoretical air-fuel ratio, that is, if the air-fuel mixture is burned in a rich combustion state, the fuel injection command value Qfin is corrected to decrease so that the amount of the fuel supplied to the combustion chamber 3 is reduced to bring the air-fuel ratio of the air-fuel mixture in the combustion chamber 3 closer to the stoichiometric air-fuel ratio. In contrast, if the detection signal from the air-fuel ratio sensor 22 represents a lean value compared with the value obtained by burning the air-fuel mixture in the combustion chamber 3 at the stoichiometric air-fuel ratio, that is, if the air-fuel mixture is burned in a lean combustion state, the fuel injection command value Qfin is corrected to increase so that the amount of the fuel supplied to the combustion chamber 3 is increased to bring the air-fuel ratio of the air-fuel mixture in the combustion chamber 3 closer to the stoichiometric air-fuel ratio. Specifically, when the purge gas flows from the canister 29 into the intake passage 2, the fuel in the purge gas causes a relatively rich air-fuel ratio in the air-fuel mixture in the combustion chamber 3. In this case, the injection amount command value Qfin is corrected to decrease through the above-described air-fuel ratio feedback correction.

Fuel injection using the port injector 6 and the direct injector 7 of the engine 1 will hereafter be described.

Figure 2:
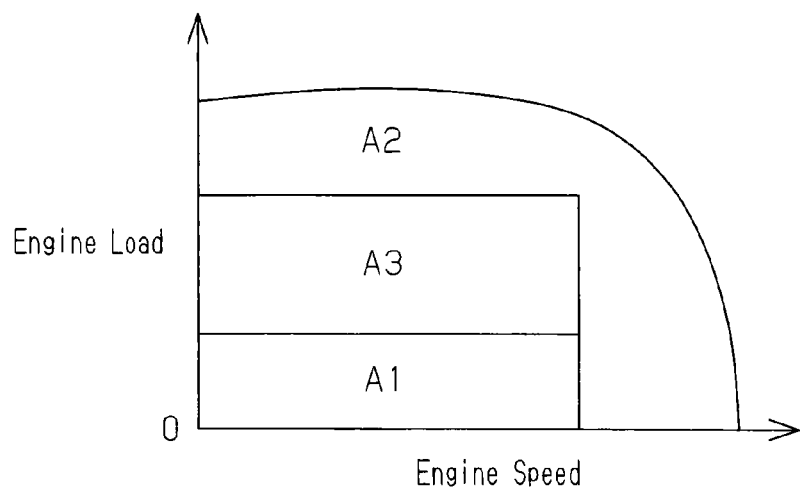
FIG. 2 is a graph representing a port injection region, a direct injection region, and a dual-injection region in the engine operating region.

In the engine 1, one or the two the injectors 6 and 7 are selected for the respective engine operating regions defined in accordance with the engine speed and the engine load, which are, as illustrated in FIG. 2, a port injection region A1, a direct injection region A2, and a dual-injection region A3.

In FIG. 2, the low-speed and low-load region of the engine 1 corresponds to the port injection region A1, in which fuel injection by the amount corresponding to the injection amount command value Qfin is carried out solely by the port injector 6. Specifically, in the low-speed and low-load region of the engine 1, movement of the piston 13 slows down, thus making it difficult to mix the air and the fuel in the combustion chamber 3 through movement of the piston 13. It is thus preferable to inject fuel solely from the port injector 6 and then mix the fuel with the air in the intake port 2a in advance before the air-fuel mixture is sent into the combustion chamber 3. Also, in the low-speed and low-load region of the engine 1, noise of the engine 1 is maintained at a low level. In this state, if fuel injection from the direct injector 7 is allowed, noise generated by actuation of the direct injector 7 may cause a problem. To avoid the problem, the low-speed and low-load region of the engine 1 is set as the port injection region.

The high-speed and high-load region of the engine 1 corresponds to the direct injection region A2 in which fuel injection by the amount corresponding to the injection amount command value Qfin is carried out solely by the direct injector 7. Specifically, for the high-speed and high-load region of the engine 1, it is preferable that the piston 13 be cooled using the latent vaporization heat produced by the fuel injected from the direct injector 7 to improve the intake charging efficiency of the engine 1 and increase the output of the engine 1. Accordingly, the direct injection region A2 is set as the region in which the output of the engine 1 is expected to be increased by direct fuel injection from the direct injector 7 into the combustion chamber 3. Further, with reference to FIG. 2, the region between the high-load operating region and the low-load operating region of the engine 1 exhibits both characteristics of the high-load region and characteristics of the low-load region. Accordingly, to match these characteristics, the region is set as the dual-injection region A3 in which fuel is injected from both the port injector 6 and the direct injector 7.

The fuel injection from the port injector 6 and the direct injector 7 in the dual-injection region A3 (the dual-injection) will hereafter be described in detail. To perform the dual-injection, the injection amount command value Qfin is divided into a port injection command value QP and a direct injection command value QD using a dual-injection rate K, which is determined based on the engine operating state including the engine speed and the engine load. The sum of the dual-values, which are the port injection command value QP and the direct injection command value QD, is equal to the injection amount command value Qfin. Then, the port injector 6 is operated to inject fuel by the amount corresponding to the port injection command value QP and the direct injector 7 is actuated to inject the fuel by the amount corresponding to the direct injection command value QD.

In the dual-injection, the port injector 6 injects fuel by the amount corresponding to the port injection command value QP in the manner described below, for example. First, a fuel injection time TAUP of the port injector 6, which is necessary for the port injector 6 to inject the fuel of the amount corresponding to the port injection command value QP under the feed pressure detected by the first pressure sensor 23, is determined based on the feed pressure. The valve of the port injector 6 is then opened for the time corresponding to the fuel injection time TAUP to inject fuel from the port injector 6 by the amount corresponding to the port injection command value QP. On the other hand, the direct injector 7 injects fuel by the amount corresponding to the direct injection command value QD in, for example, the manner described below. First, a fuel injection time TAUD of the direct injector 7, which is necessary for the direct injector 7 to inject the fuel of the amount corresponding to the direct injection command value QD under the direct injection pressure detected by the second pressure sensor 24, is determined based on the direct injection pressure. The valve of the direct injector 7 is then opened for the time corresponding to the fuel injection time TAUD to inject fuel from the direct injector 7 by the amount corresponding to the direct injection command value QD.

Figure 3:
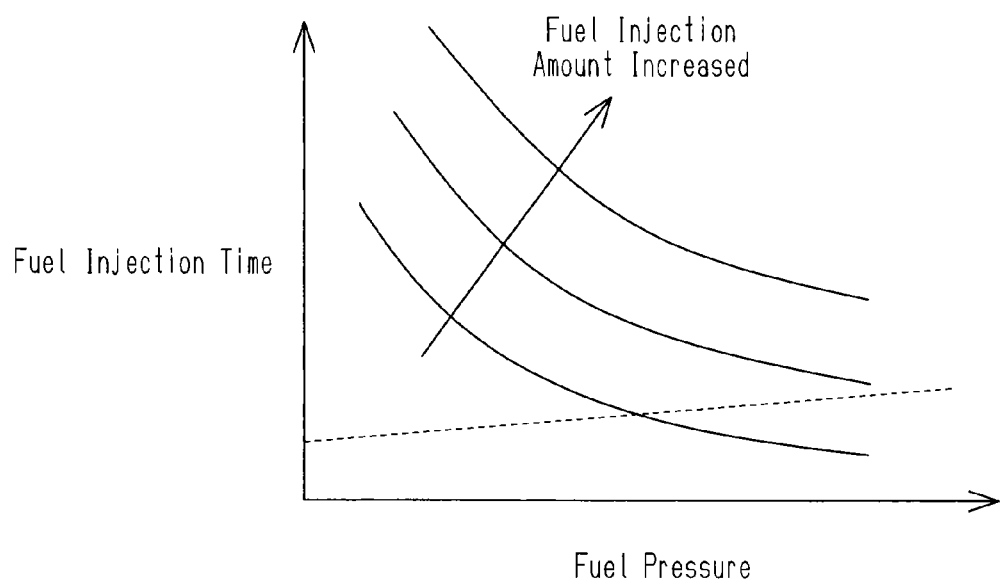
FIG. 3 is a graph representing the relationship between the fuel injection time and the fuel pressure of an injector.

The solid-line curves in FIG. 3 represent the relationship among the fuel injection amount, the fuel pressure, and the fuel injection time in each fuel injection valve (each injector), such as the port injector 6 and the direct injector 7. The solid-line curves represent combinations of the fuel pressure and the fuel injection time under a constant fuel injection amount. A curve located higher and more to the right side in the graph represents a greater fuel injection amount for the corresponding combination. The fuel injectors have a minimum value of the fuel injection time determined by the structure of the injector. The minimum value varies as indicated by the broken curve in FIG. 3, for example. When the fuel injection time is less than the minimum value, the fuel injection from the injector is destabilized, thus hampering accurate adjustment of the fuel injection amount. To avoid this problem, lower limit guarding is performed in adjustment of the fuel injection time of each injector in the fuel injection amount control to prevent the fuel injection time from becoming less than the minimum value. Specifically, the minimum value TAUPmin of the fuel injection time of the port injector 6 changes in accordance with the port fuel pressure. The minimum value TAUDmin of the fuel injection time of the direct injector 7 changes according to the direct injection pressure. The minimum value TAUPmin for the port injector 6 and the minimum value TAUDmin for the direct injector 7 change in mutually different manners in response to a change in the fuel pressure (the port fuel pressure or the direct injection pressure).

Problems of the above-described dual-injection and a solution to the problems will now be described.

The engine 1 may start the dual-injection to perform fuel injection from the direct injector 7 after the fuel is injected solely from the port injector 6 for a continuous period of time. In this case, the problem described below may occur.

In the continuous period of time in which the fuel is injected solely from the port injector 6, fuel injection from the direct injector 7 is suspended, thus causing fuel to stagnate in the high-pressure fuel pipe 33 connected to the direct injector 7. The stagnant fuel is heated and expanded by the heat produced by the engine 1 and raises the pressure of the fuel that will be fed to the direct injector 7 (the direct injection pressure). Under these conditions, if the dual-injection is started to resume the fuel injection from the direct injector 7 under these conditions, the fuel injection time TAUD must be decreased to match the aforementioned raised direct injection pressure to ensure that the direct injector 7 injects the fuel of the amount corresponding to the direct injection command value QD. If the fuel injection time TAUD is reduced to a value less than the minimum value TAUDmin, the lower limit guarding is carried out such that the fuel injection time TAUD is set to the minimum value TAUDmin. In this case, an excessive amount of fuel is injected from the direct injector 7, which affects combustion of the air-fuel mixture (the fuel) in the combustion chamber 3 in an undesired manner.

To solve this problem, the dual-injection is carried out in the manner described below if the fuel injection time TAUD of the direct injector 7, which is determined based on the direct injection pressure, is less than the minimum value TAUDmin at the execution of the dual-injection.

That is, the dual-injection is performed using such a dual-injection rate that the amount of the fuel injected by the direct injector 7 is increased compared with the amount of the fuel injected at the dual-injection rate K, which is determined in accordance with the engine operating state. As a result, the increased amount of fuel is injected from the direct injector 7, and the heated fuel stagnated in the high-pressure fuel pipe 33, which is connected to the direct injector 7, is quickly injected and consumed. This rapidly lowers the direct injection pressure and thus quickly increases the fuel injection time TAUD of the direct injector 7 to the minimum value TAUDmin to ensure injection of the fuel by the amount corresponding to the direct injection command value QD. As a result, even if an excessive amount of fuel is injected from the direct injector 7 due to the excessively raised direct injection pressure when the dual-injection is started, the excessive fuel injection is quickly ended and hampering of the fuel combustion in the cylinder caused by such excessive fuel injection is suppressed.

In the illustrated embodiment, a first dual-injection and a second dual-injection are performed as the dual-injection at the dual-injection rate that increases the amount of the fuel injected from the direct injector 7 compared with the corresponding fuel injection in the dual-injection at the dual-injection rate K, which is determined in accordance with the engine operation state. In the first dual-injection, the fuel injection time TAUD of the direct injector 7 is set to the minimum value TAUDmin to inject fuel from the direct injector 7. Out of the amount of fuel corresponding to the fuel injection command value Qfin, the port injector 6 injects the fuel of the amount that cannot be injected by the direct injector 7. The second dual-injection is performed when the fuel injection amount of the port injector 6 (the port injection command value QP) is great to such an extent that the fuel injection time TAUP of the port injector 6 must be decreased to a value less than the minimum value TAUPmin in the first dual-injection. Specifically, the second dual-injection is performed at such a dual-injection rate that fuel injection is carried out solely by the direct injector 7. The electronic control unit 16 functions as an injection control section for performing the first dual-injection and the second dual-injection.

The detailed procedure for executing the dual-injection of the illustrated embodiment will now be described with reference to the flowcharts of FIGS. 4 and 5, each of which represents an injection control routine. The injection control routine is carried out by the electronic control unit 16 periodically in an interrupting manner at, for example, predetermined time intervals when the engine operating state corresponds to the dual-injection region A3.

Figure 4:
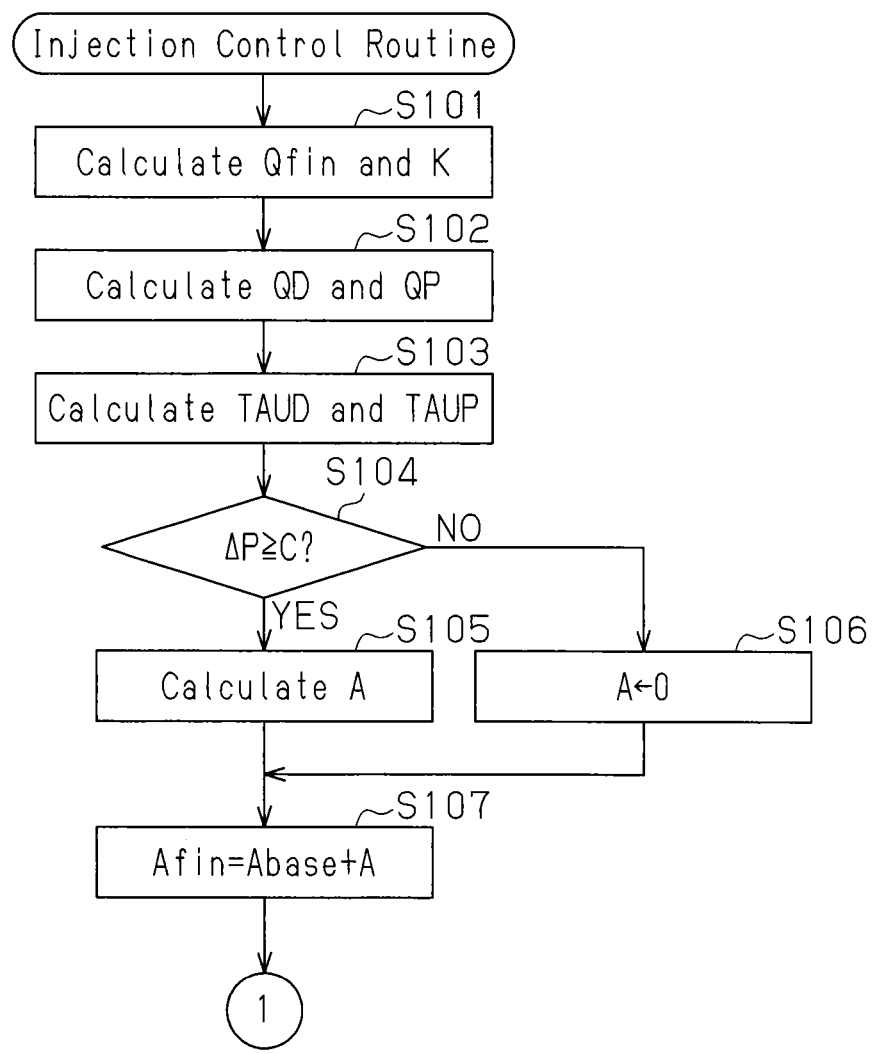
FIG. 4 is a flowchart representing a detailed procedure for dual-injection.

The injection control routine is started by determining the injection amount command value Qfin and the dual-injection rate K each based on the engine operating state including the engine speed and the engine load (S101 of FIG. 4). The thus determined dual-injection rate K is a variable value in the range of 0 to 1.0, for example, in accordance with the engine speed and the engine load. Then, using the injection amount command value Qfin and the dual-injection rate K, the direct injection command value QD and the port injection command value QP are calculated (S102). In other words, the injection amount command value Qfin is multiplied by the dual-injection rate K and the obtained value is set as the direct injection command value QD. Also, the injection amount command value Qfin is multiplied by the value obtained by subtracting the dual-injection rate K from 1 (1−K). The obtained value is set as the port injection command value QP.

When the direct injection command value QD and the port injection command value QP are calculated, the fuel injection time TAUP of the direct injector 7 and the fuel injection time TAUD of the port injector 6 are determined (S103). In other words, the fuel injection time TAUD of the direct injector 7 necessary for the direct injector 7 to inject fuel by the amount corresponding to the direct injection command value QD is calculated based on the direct injection pressure and the direct injection command value QD. Also, the fuel injection time TAUP of the port injector 6 necessary for the port injector 6 to inject fuel by the amount corresponding to the port injection command value QP is calculated based on the port fuel pressure and the port injection command value QP.

Steps S104 to S107 of the injection control routine are carried out when the direct injection pressure rises in the dual-injection. That is, the steps are performed to advance the fuel injection timing of the direct injector 7 such that the fuel injected by the direct injector 7 strikes the top surface of the piston 13 and thus disperses in the cylinder. The electronic control unit 16 functions as an injection timing advancing section when steps S104 to S107 are performed.

In these steps, it is first determined whether the pressure difference LP between the direct injection pressure and the target value of the direct injection pressure is greater than or equal to a predetermined value C (S104). The target value of the direct injection pressure is a variable value that is determined as an optimal direct injection pressure in accordance with the engine operating state including the engine speed and the engine load. That is, in the determination of S104, it is determined whether the direct injection pressure is greater than or equal to a threshold value, which is obtained by adding the aforementioned target value to the value C. If a positive determination is made in step S104, the advancement amount A for the fuel injection timing is set to a value greater than 0 (S105). For a negative determination made in step S104, the advancement amount A is set to 0 (S106). Subsequently, the injection timing command value Afin for the direct injector 7 is obtained by adding the advancement amount A to a base injection timing Abase, which is determined in accordance with the engine operating state including the engine speed and the engine load (S107).

By controlling the fuel injection timing of the direct injector 7 based on the injection timing command value Afin, the fuel injection timing of the direct injector 7 is advanced when the dual-injection is in operation and the direct injection pressure is a high value greater than or equal to the aforementioned threshold value. Specifically, as has been described, when the direct injection pressure is high, the fuel injected from the direct injector 7 has a high penetration property. This makes it difficult for the fuel to disperse and ensure desired fuel combustion in the cylinder. However, by advancing the fuel injection timing of the direct injector 7 in the above-described manner when the direct injection pressure is high, the fuel injected by the direct injector 7 strikes the top surface of the piston 13 and thus disperses in the cylinder. The dispersed fuel in the cylinder ensures desired combustion of the fuel.

Step S108 and the following steps of FIG. 5 are employed to execute the first dual-injection and the second dual-injection in the injection control routine. The steps include determination whether the fuel injection time TAUD of the direct injector 7 is greater than or equal to the minimum value TAUDmin (S108) and determination whether the fuel injection time TAUP of the port injector 6 is greater than or equal to the minimum value TAUPmin (S115). Specifically, the minimum value TAUDmin is determined based on the direct-injection pressure and the minimum value TAUPmin is a value determined in accordance with the port fuel pressure. If positive determinations are made in both step S108 and step S115, the flag F for determining whether or not to restrict the flow of purge gas from the canister 29 into the intake passage 2 is set to 0 (indicating non-restriction) (S116). Subsequently, the valve of the direct injector 7 is opened for the time corresponding to the fuel injection time TAUD to inject fuel from the direct injector 7 by the amount corresponding to the direct injection command value QD. Also, the valve of the port injector 6 is opened for the time corresponding to the fuel injection time TAUP to inject fuel from the port injector 6 by the amount corresponding to the port injection command value QP.

If the flag F is set to 0 in step S116, the purge gas flow from the canister 29 into the intake passage 2 is not restricted. In contrast, the flag F is set to 1 (indicating restriction) when it is determined that the fuel injection time TAUD of the direct injector 7 is less than the minimum value TAUDmin (S109). In this case, the purge gas flow from the canister 29 into the intake passage 2 is restricted. In other words, the purge control valve 30 is closed to prohibit the flow of purge gas from the canister 29 into the intake passage 2. Alternatively, the purge gas flow from the canister 29 into the intake passage 2 can be limited by decreasing the opening degree of the purge control valve 30 to reduce the amount of the purge gas flowing from the canister 29 into the intake passage 2, instead of prohibiting the purge gas flow from the canister 29 into the intake passage 2. The electronic control unit 16 functions as a purge control section when the electronic control unit 16 restricts the purge gas flow from the canister 29 into the intake passage 2 in the above-described manner.

After the flag F is set to 1 in step S109, the fuel injection time TAUD of the direct injector 7 is set to the minimum value TAUDmin to perform the lower limit guarding on the fuel injection time TAUD using the minimum value TAUDmin (S110). Then, the port injection command value QP and the fuel injection time TAUP of the port injector 6 are recalculated for the fuel injection by the direct injector 7 for the time corresponding to the fuel injection time TAUD that has been set to the minimum value TAUDmin (S111). Specifically, the amount of the fuel injected from the direct injector 7 for the time corresponding to the fuel injection time TAUD (the minimum value TAUDmin) and under the current direct injection pressure is calculated as the direct injection command value QD. The direct injection command value QD is then subtracted from the injection amount command value Qfin and the thus obtained value is set as the port injection command value QP. Further, the fuel injection time TAUP necessary for the port injector 6 to inject the fuel of the amount corresponding to the port injection command value QP is determined in accordance with the port injection command value QP and the current feed pressure.

After the fuel injection time TAUP of the port injector 6 is recalculated in the above-described manner, it is determined whether the fuel injection time TAUP is greater than or equal to the minimum value TAUPmin. If a positive determination is made, step S117 is carried out. In contrast, if it is determined that the fuel injection time TAUP is less than the minimum value TAUPmin, the fuel injection time TAUP is set to 0 (S113). Subsequently, to recalculate the direct injection command value QD and the fuel injection time TAUD of the direct injector 7, the current injection amount command value Qfin is set as the direct injection command value QD and the fuel injection time TAUD necessary for the direct injector 7 to inject the fuel of the amount corresponding to the direct injection command value QD (the injection amount command value Qfin) is determined (S114). Then, step S117 is carried out. Steps S113 and S114 are carried out also when a negative determination is made in step S115.

If steps S110 to S112 of the injection control routine are carried out and ended with a positive determination in S112, step S117 is carried out such that the above-described first dual-injection is performed. In contrast, when steps S110 to S112 are ended with a negative determination in S112, steps S113, S114, and S117 are carried out to perform the above-described second dual-injection.

The operation of the dual-injection of the illustrated embodiment will now be described with reference to the timing chart of FIG. 6.

After the engine 1 continuously injects fuel solely from the port injector 6, the direct injection pressure, which is represented in FIG. 6(a), rises. In this state, to perform the dual-injection at the dual-injection rate determined in accordance with the engine operating state, the fuel injection time TAUD of the direct injector 7 may have to be less than the minimum value TAUDmin such that the fuel is injected from the direct injector 7 by the amount corresponding to the direct injection command value QD.

In this case, to start the dual-injection by the first dual-injection, the fuel injection time TAUD of the direct injector 7 is set to the minimum value TAUDmin. Then, the fuel injection time TAUP of the port injector 6 is determined to ensure that, out of the amount of fuel corresponding to the fuel injection command value Qfin, the port injector 6 injects fuel of the amount that cannot be injected by the direct injector 7 in the fuel injection time TAUD (the minimum value TAUDmin). At this stage, the fuel injection time TAUP of the port injector 6 may be less than the small value TAUPmin.

If the fuel injection time TAUP of the port injector 6 is less than the minimum value TAUPmin, the first dual-injection is switched to the second dual-injection. In other words, the fuel injection time TAUP (the port injection command value QP) is set to 0 to suspend the fuel injection from the port injector 6 and the direct injection command value QD is set as the injection amount command value Qfin. The direct injector 7 thus injects the fuel of the amount corresponding to the direct injection command value QD (the injection amount command value Qfin). In this manner, the above-described second dual-injection, which is the dual-injection at such a dual-injection rate (1.0) that fuel is injected solely from the direct injector 7, is carried out. When the second dual-injection is started (at the time point T1), the actual dual-injection rate for the engine 1 switches from 0 to 1.0, as illustrated in FIG. 6(b).

In the second dual-injection, if the fuel injection time TAUP of the port injector 6, which is used for the first dual-injection, exceeds the minimum value TAUPmin, the second dual-injection is switched to the first dual-injection. When the first dual-injection is started (at the time point T2), the actual dual-injection rate for the engine 1 changes from 1.0 to a value closer to 0, with reference to FIG. 6(b). At this stage, the actual dual-injection rate is variable in accordance with the direct injection command value QD for the fuel injection time TAUD of the direct injector 7 set to the minimum value TAUDmin and the injection amount command value Qfin determined in accordance with the engine operating state. The actual dual-injection rate at this stage is set to such a value that the amount of the fuel injected by the direct injector 7 increases compared with the corresponding fuel injection amount in the dual-injection at the dual-injection rate K, which is determined in accordance with the engine operating state.

By performing the second dual-injection and the first dual-injection in the above-described manner, the high temperature and pressure fuel stagnant in the high-pressure fuel pipe 33, which is connected to the direct injector 7, is quickly injected from the direct injector 7 and thus consumed. This rapidly lowers the direct injection pressure as represented in FIG. 6(a), thus allowing the fuel injection time TAUD necessary for the direct injector 7 to inject fuel by the amount corresponding to the direct injection command value QD, which is the fuel injection time TAUD determined based on the direct injection pressure, to rise quickly to the minimum value TAUDmin. When the fuel injection time TAUD of the direct injector 7 obtained based on the direct injection pressure increases to the minimum value TAUDmin, the dual-injection at the dual-injection rate K, which is determined in accordance with the engine operating state, is started (at the time point T3).

In the dual-injection, when the direct injection pressure is greater than or equal to the aforementioned threshold value (the value C+the target value), the advancement amount A for advancing the fuel injection timing of the direct injector 7 is set to a value greater than 0 (at the time point T1), as represented in FIG. 6(c). This advances the fuel injection timing of the direct injector 7 by the advancement amount A in the dual-injection. The advancement amount A may be, for example, a variable value that is determined in accordance with the pressure difference ΔP between the direct injection pressure and the target direct injection pressure such that the advancement amount A gradually decreases as the pressure difference LP decreases. Accordingly, if the direct injection pressure lowers as represented in FIG. 6(a) and the pressure difference ΔP decreases, the advancement amount A gradually decreases with reference to FIG. 6(c), for example.

At the time point T1, the dual-injection (the second dual-injection in the illustrated embodiment) is started at the dual-injection rate that increases the fuel injection amount of the direct injector 7 compared with the corresponding fuel injection amount in the dual-injection at the dual-injection K, which corresponds to the engine operating state. At this point, with reference to FIG. 6(d), the flag F is switched from 0 (indicating non-restriction) to 1 (indicating restriction). This restricts the purge gas flow from the canister 29 into the intake passage 2 when the above-described dual-injection is in execution. When the dual-injection with the increased fuel injection from the direct injector 7 is ended at the time point T3, the dual-injection at the aforementioned dual-injection rate K, which is determined in accordance with the engine operating state. At this point, the flag F is changed from 1 (indicating restriction) to 0 (indicating non-restriction). This permits the purge gas flow from the canister 29 into the intake passage 2.

The illustrated embodiment, which has been described in detail, has the advantages described below.

(1) At the execution of the dual-injection, if the fuel injection time TAUD of the direct injector 7, which is determined in accordance with the direct injection pressure, is less than the minimum value TAUDmin, the dual-injection is started at the dual-injection rate that increases the amount of the fuel injected by the direct injector 7 compared with the corresponding fuel injection amount in the dual-injection at the dual-injection rate K, which is determined in accordance with the engine operating state.

As the dual-injection at the aforementioned dual-injection rate increasing the fuel injection from the direct injector 7, the first dual-injection and the second dual-injection are performed in the manners described below. In the first dual-injection, the fuel injection time TAUD of the direct injector 7 is set to the minimum value TAUDmin to perform fuel injection from the direct injector 7. Out of the amount of fuel corresponding to the fuel injection command value Qfin, the port injector 6 injects fuel of the amount that cannot be injected by the direct injector 7. The second dual-injection is carried out if the fuel injection amount of the port injector 6 (the port injection command value QP) is great to such an extent that the fuel injection time TAUP of the port injector 6 in the first dual-injection must be set to a value less than the minimum value TAUPmin. Specifically, the second dual-injection is performed at such a dual-injection rate that fuel injection is performed solely by the direct injector 7.

The first dual-injection and the second dual-injection increase the amount of the fuel injected from the direct injector 7 such that the heated fuel stagnant in the high-pressure fuel pipe 33, which is connected to the direct injector 7, is quickly injected and consumed. This rapidly lowers the pressure of the fuel supplied to the direct injector 7 and thus quickly increases the fuel injection time TAUD of the direct injector 7 to the minimum value TAUDmin. As a result, even if an excessively raised direct injection pressure causes an excessive amount of fuel injected from the direct injector 7 at the start of the dual-injection by the engine 1, such excessive fuel injection is quickly ended to restrict hampering of fuel combustion in the cylinder, which is brought about by the excessive fuel injection.

(2) In the first dual-injection and the second dual-injection, the employed dual-injection rate is not the value corresponding to the engine operating state (the dual-injection rate K). It is thus difficult to maintain optimal fuel combustion in the cylinder. However, in the dual-injection, the fuel injection time TAUD of the direct injector 7 on the assumption that the dual-injection is executed at the dual-injection rate K, which is obtained in accordance with the engine operating state, is calculated based on the direct injection pressure. When the fuel injection time TAUD rises to the minimum value TAUDmin, the dual-injection at the dual-injection rate K, which corresponds to the engine operating state, is resumed. This restricts unnecessarily prolonged execution of the dual-injection at the dual-injection rate that increases the fuel injected from the direct injector 7 compared with the corresponding fuel injection in the dual-injection at the dual-injection rate K, which is determined in accordance with the engine operating state. As a result, non-optimal fuel combustion in the cylinder is limited.

(3) At the execution of fuel injection from the direct injector 7 during the duel-injection, if the direct injection pressure is greater than or equal to the threshold value (the value C+the target value), which is greater than the target value determined in accordance with the engine operating state, the fuel injection timing of the direct injector 7 is advanced. Specifically, when the direct injection pressure is a high value greater than or equal to the threshold value, the fuel injected from the direct injector 7 has a high penetration property. This makes it difficult for the fuel to disperse and ensure desired fuel combustion in the cylinder. However, by advancing the fuel injection timing of the direct injector 7 when the direct injection pressure is greater than or equal to the threshold value, the fuel injected from the direct injector 7 strikes the top surface of the piston 13 of the engine 1 and thus disperses in the cylinder. Such fuel dispersion in the cylinder maintains the fuel combustion in a desired state.

(4) When the first dual-injection or the second dual-injection is performed, the purge gas flow from the canister 29 into the intake passage 2 of the engine 1 is restricted. In the engine 1, if the purge gas flows from the canister 29 into the intake passage 2, the injection amount command value Qfin is decreased by the amount corresponding to the amount of the fuel contained in the purge gas. In this state, the fuel injection time TAUD of the direct injector 7 is likely to be less than the minimum value TAUDmin. However, such likeliness is limited through restriction of the purge gas flow from the canister 29 into the intake passage 2.

The illustrated embodiment may be modified to the forms described below.

The timing for starting restriction of the purge gas flow from the canister 29 into the intake passage 2 of the engine 1 may be advanced relative to the timing for starting the dual-injection (the first dual-injection or the second dual-injection) at the dual-injection rate that increases the fuel injected by the direct injector 7.

Specifically, the dual-injection at the dual-injection rate increasing the fuel injection from the direct injector 7 may be started with a predetermined delay (the period from T1 to Ta) after the flag F is switched from 0 (indicating non-restriction) to 1 (indicating restriction) at the time point T1, with reference to FIG. 7. In FIG. 7, sections (a), (b), (c), and (d) represent changes in the direct injection pressure, the actual dual-injection rate, the advancement amount A, and the flag F, respectively, as the time elapses, as in FIG. 6. Alternatively, with reference to FIG. 8, the time point T1 for starting the dual-injection at the dual-injection rate increasing the fuel injection from the direct injector 7 may be estimated from the engine operating state. In this case, the flag F is switched from 0 (indicating non-restriction) to 1 (indicating restriction) at a time point (T0) before the estimated time point T1. In FIG. 8, sections (a), (b), (c), and (d) represent changes in the direct injection pressure, the actual dual-injection rate, the advancement amount A, and the flag F, respectively, as the time elapses, as in FIG. 6.

After restriction of the purge gas flow from the canister 29 into the intake passage 2 of the engine 1 is started, such restriction is reflected in operation of the engine 1 only after a certain time. Accordingly, if the timing for starting restriction of the purge gas flow from the canister 29 into the intake passage 2 of the engine 1 coincides with the timing for starting the dual-injection at the dual-injection rate increasing the fuel injection from the direct injector 7, a problem may occur as will be described. That is, in the time period before the restriction of the purge gas flow is reflected in the operation of the engine 1, the fuel contained in the purge gas is likely to decrease the fuel injection time TAUD of the direct injector 7 to a value less than the minimum value TAUDmin. However, by advancing the timing for starting the restriction of the purge gas flow from the canister 29 into the intake passage 2 of the engine 1 relative to the timing for starting the dual-injection at the dual-injection rate increasing the fuel injection from the direct injector 7, occurrence of the above-described problem is limited.

The electronic control unit 16 functions as a timing control section when advancing the timing for starting the restriction of the purge gas flow from the canister 29 into the intake passage 2 of the engine 1 relative to the timing for starting the dual-injection at the dual-injection rate increasing the fuel injection from the direct injector 7.

As the dual-injection at the dual-injection rate increasing the fuel injection from the direct injector 7 compared with the corresponding fuel injection in the dual-injection at the dual-injection rate K, which is determined in accordance with the engine operating state, only one of the first dual-injection and the second dual-injection may be carried out. For example, if only the second dual-injection is carried out, the dual-injection rate (1.0) at which fuel is injected solely from the direct injector 7 is employed as the dual-injection rate increasing the fuel injection from the direct injector 7 compared with the corresponding fuel injection in the dual-injection at the dual-injection rate K, which is obtained in accordance with the engine operating state.

In the dual-injection, the restriction of the purge gas flow from the canister 29 into the intake passage 2 does not necessarily have to be performed.

In the dual-injection, the advancement of the fuel injection timing of the direct injector 7 does not necessarily have to be carried out.

Description of the Reference Numerals

1 . . . engine, 2 . . . intake passage, 2a . . . intake port, 3 . . . combustion chamber, 4 . . . throttle valve, 5 . . . accelerator pedal, 6 . . . port injector, 7 . . . direct injector, 8 . . . fuel tank, 9 . . . feed pump, 10 . . . high-pressure fuel pump, 12 . . . spark plug, 13 . . . piston, 14 . . . crankshaft, 15 . . . exhaust passage, 16 . . . electronic control unit, 17 . . . accelerator position sensor, 18 . . . throttle position sensor, 19 . . . air flow meter, 20 . . . crank position sensor, 21 . . . cam position sensor, 22 . . . air-fuel ratio sensor, 23 . . . first pressure sensor, 24 . . . second pressure sensor, 25 . . . intake camshaft, 26 . . . intake valve, 27 . . . exhaust camshaft, 28 . . . exhaust valve, 29 . . . canister, 30 . . . purge control valve, 31 . . . low-pressure fuel pipe, 22 . . . pressure regulator, 33 . . . high-pressure fuel pipe

The invention claimed is:
1. A control apparatus for an internal combustion engine, the control apparatus being employed for an internal combus- tion engine having a port injector for injecting fuel to an intake port and a direct injector for injecting fuel into a cylinder, wherein the control apparatus performs dual-injection, in which fuel injection by an amount corresponding to an injection amount command value is carried out through injection from the port injector and injection from the direct injector in a manner divided based on a dual-injection rate, which is determined in accordance with an engine operating state, the control apparatus comprising an injection control section, wherein, when performing the dual-injection, if a fuel injection time of the direct injector that is determined based on the pressure of fuel supplied to the direct injector is less than a minimum value determined by the structure of the direct injector, the injection control section performs the dual-injection in which fuel of the amount corresponding to the injection amount command value is injected at such a dual-injection rate that the fuel injection from the direct injector is more than that in the dual-injection in which fuel of the amount corresponding to the injection amount command value is injected at the dual-injection rate determined in accordance with the engine operating state, wherein the injection control section performs a first dual-injection or a second dual-injection as the dual-injection at the dual-injection rate at which the fuel injection from the direct injector is more than the fuel injection in the dual-injection at the dual-injection rate determined in accordance with the engine operating state, in the first dual-injection, the direct injector injects fuel for the fuel injection time of the direct injector that is set to the minimum value and the port injector injects, out of the amount of fuel corresponding to the injection amount command value, fuel of an amount that cannot be injected by the direct injector, and the second dual-injection sets the dual-injection rate to a value at which fuel is injected solely from the direct injector, the injection control section gives priority to the first dual-injection rather than the second dual-injection, and carries out the second dual-injection instead of the first dual-injection when the amount of fuel injected from the port injector is small to such an extent that the fuel injection time of the port injector in the first dual-injection must be set to a value less than a minimum value determined by the structure of a port injector.

2. The control apparatus according to claim 1, wherein during the execution of the dual-injection at the dual-injection rate at which the fuel injection from the direct injector is more than that in the dual-injection at the dual-injection rate determined in accordance with the engine operating state, if the fuel injection time of the direct injector that is determined based on the pressure of the fuel supplied to the direct injector on the assumption that the dual-injection is executed at the dual-injection rate obtained in accordance with the engine operating state is raised to the minimum value, the injection control section switches the dual-injection to the dual-injection at the dual-injection rate determined in accordance with the engine operating state.

3. The control apparatus according to claim 1, further comprising an injection timing advancing section that advances fuel injection timing of the direct injector if, at the execution of the fuel injection from the direct injector, the pressure of fuel supplied to the direct injector is higher than a threshold value greater than a target value determined in accordance with the engine operating state.

4. The control apparatus according to claim 1, further comprising a purge restricting section that restricts flow of gas from a canister into an intake system of the engine when the dual-injection is performed at the dual-injection rate at which the fuel injection from the direct injector is more than that in the dual-injection at the dual-injection rate determined in accordance with the engine operating state.

5. The control apparatus according to claim 4, further comprising a timing control section that controls the injection control section and the purge restricting section such that the timing for starting restriction of the gas flow from the canister into the intake system of the engine is advanced relative to the timing for starting the dual-injection at the dual-injection rate at which the fuel injection from the direct injector is increased.

* * * * *